US008025032B2

(12) United States Patent
Freedman (10) Patent No.: US 8,025,032 B2
(45) Date of Patent: Sep. 27, 2011

(54) ANIMAL TRAINING DEVICE

(76) Inventor: Barry L. Freedman, Stansbury Park, UT (US)

( * ) Notice: Subject to any disclaimer, the term of this patent is extended or adjusted under 35 U.S.C. 154(b) by 263 days.

(21) Appl. No.: 12/256,318

(22) Filed: Oct. 22, 2008

(65) Prior Publication Data

US 2009/0101082 A1   Apr. 23, 2009

Related U.S. Application Data

(60) Provisional application No. 60/981,637, filed on Oct. 22, 2007.

(51) Int. Cl.
*A01K 15/02* (2006.01)

(52) U.S. Cl. .......................... 119/753; 119/755; 119/756

(58) Field of Classification Search .................. 119/753, 119/755, 756, 757
See application file for complete search history.

(56) References Cited

U.S. PATENT DOCUMENTS

| | | | | |
|---|---|---|---|---|
| 83,672 A * | 11/1868 | Styer | ............................. | 119/757 |
| 2,187,337 A * | 1/1940 | Wang | ............................. | 119/755 |
| 2,804,845 A * | 9/1957 | Plumley et al. | ............... | 119/756 |
| 3,215,834 A * | 11/1965 | Tayman | ........................ | 378/174 |
| 4,693,212 A * | 9/1987 | Black | ............................. | 119/755 |
| 5,385,119 A * | 1/1995 | Tarulli | ........................... | 119/755 |
| 5,983,835 A | 11/1999 | Catlin | | |
| 6,283,972 B1 * | 9/2001 | Riley | ................................ | 606/81 |
| 6,499,436 B1 * | 12/2002 | Capperrune | ................... | 119/792 |
| 7,089,884 B2 * | 8/2006 | Wang et al. | .................... | 119/753 |
| 7,337,855 B2 * | 3/2008 | Keeler | ............................. | 168/44 |
| 7,428,760 B2 * | 9/2008 | McCrimmon | .................... | 5/611 |
| 7,603,966 B1 * | 10/2009 | Beebe | ............................ | 119/755 |

OTHER PUBLICATIONS

Introducing Happy Legs, http://www.happylegs.com/, printed Aug. 5, 2008, 7 pages.

* cited by examiner

*Primary Examiner* — Yvonne R. Abbott
(74) *Attorney, Agent, or Firm* — Maschoff Gilmore & Israelsen (57) ABSTRACT

A dog training device may include a base with a first cross member slidably connected to the base and a second cross member slidably connected to the base. A first set of pedestals may be slidably connected to the first cross member and a second set of pedestals may be slidably connected to the second cross member. Advantageously, the distances between the cross members and the pedestals may be adjusted so that the dog training device may be used with dogs of various shapes and sizes. In addition, the base, cross members and pedestals may be quickly and easily connected and disconnected, which may facilitate transportation and storage of the device. The base, cross members and pedestals may also be securely interconnected to provide a stable and steady dog training device.

20 Claims, 5 Drawing Sheets

FIG. 5

ANIMAL TRAINING DEVICE

CROSS-REFERENCE TO RELATED APPLICATIONS

This application claims priority to and the benefit of U.S. Provisional Patent Application Ser. No. 60/981,637, entitled DOG STACKING TRAINER, which was filed on Oct. 22, 2007, and is hereby incorporated by reference in its entirety.

BACKGROUND OF THE INVENTION

1. Field of the Invention

The present invention is generally directed towards an animal training device and, in particular, to a dog training device such as a dog stacking trainer.

2. Description of Related Art

Animals, such as dogs, are often trained to perform certain actions. For example, dogs may be trained to follow obedience commands, perform tricks, be a guide dog to lead the blind, be a rescue dog to find victims of a disaster, be a hunting dog to aid in hunting, or serve as a guard animal.

Animals may also be trained for other purposes, such as to stand in a desired position as part of a competition. For example, dogs are frequently trained to stand a particular way when being presented or examined as part of a conformation competition at a show. Traditionally, this presentation is done by having the dog stand in a manner which shows off its physical features, position, stance, coat, etc. In particular, dogs are many times taught to stand in a slightly stretched position with all four feet on the ground. Standing in the proper position is often referred to as "stacking."

Dogs must be trained to stand in the proper position and many conventional dog training methods involve rewarding desired behavior while ignoring or correcting undesired behavior. Because dogs may have a strong sense of kinesiological awareness and may be acutely aware of their body position, dogs may be trained to stand in the desired position. During such training, the dog may be placed in the desired position and may be rewarded for maintaining the desired position. Over the years, many techniques and devices have been used to teach the dog the proper stacking position. Some trainers may have used soup cans, blocks of wood and the like to reinforce the proper stacking position.

Conventional dog training devices, however, may cause physical harm or injury to the dog. Conventional dog training devices may also include multiple parts and may be difficult to use. In addition, many traditional dog training devices may not be very sturdy and the components may not be securely fastened together. Thus, the devices may wobble or undesirably move, which may make the training of the dog more difficult and time consuming. Further, many known dog training devices can only be used with dogs of certain sizes or types, and cannot be used on dogs of different types, sizes and abilities.

BRIEF SUMMARY OF THE INVENTION

A need therefore exists for an animal training device that eliminates the above-described disadvantages and problems.

One aspect is an animal training device that can be used in connection with dogs. Advantageously, the device can be used with dogs of various shapes, sizes and types. For example, the device can be used with relatively small dogs that weigh ten pounds or less. The device can also be used with larger dogs that weigh up to one hundred pounds or more.

Another aspect is a dog training device that can be quickly and easily adjusted. This may facilitate use of the device with a wide range of dogs. For example, the length and/or width of the dog training device may be quickly and easily adjusted. This may allow the device to be used with dogs of different sizes.

Still another aspect is a dog training device that may be easily assembled and disassembled. For instance, the device may be stored or transported in an unassembled configuration and then it may be quickly and easily assembled for use. In addition, the device may be partially or completely disassembled, if desired. The device may also include only a few parts and components, which may make the device easier to manufacture and assemble.

Yet another aspect is a dog training device that may be straightforward to assemble, disassemble and/or adjust. Additionally, the same structures may be used to adjust the positioning of the dog training device and assemble or disassemble the device.

Still yet another aspect is a dog training device that may be stable and sturdy. Advantageously, because the dog training device may be securely disposed in a fixed position, it may not inadvertently move or wobble when being used. Thus, the dog may be trained on a steady, constant device, which may facilitate the training process.

A further aspect is a dog training device that may include four supports or pedestals and a dog may stand upon the pedestals to be trained to stand in the correct position. In particular, the device may include four pedestals and the dog's paws may be placed on the pedestals to correctly position the dog. The pedestals may have a height of several inches and the pedestals may have a size that is slightly larger than the dog's paw, which may allow the dog to be trained to stand in the correct position. Advantageously, the locations of the pedestals may be changed to facilitate use of the training device with different types, shapes and sizes of dogs. When the training device is being used, the pedestals are preferably secured in fixed locations so that the pedestals do not move or wobble while being used. The pedestals, however, may be quickly and easily moved into new locations if desired. The pedestals may also be quickly and easily removed for storage or transportation.

Another further aspect is a dog training device that may include a base and two cross-beams or cross members. The cross members are preferably connected to the base. In particular, the cross members are preferably slidable relative to the base and the cross members may be secured in a fixed position relative to the base. The pedestals may be attached to the cross members and the pedestals are preferably movable relative to the cross members. Advantageously, because the cross members and pedestals may be movable, the dog training device may be disposed in numerous configurations and arrangements. For example, the cross members may be movable relative to the base to allow the length of the training device to be changed and the pedestals may be movable relative to the cross members to allow the distance between the pedestals to be changed.

Still another further aspect is a dog training device that may include a base with a first cross member connected proximate one end of the base and a second cross member connected proximate the other end of the base. The cross members are preferably slidably connected along at least a portion of the length of the base to allow the distance between the cross members to be adjusted. This may allow the dog training device to be adjusted according to the length of the dog. The base and the cross members are preferably securely connected when the cross members are disposed in the desired positions to create a strong and sturdy platform. The cross members may also be quickly and easily detached from the base, which may facilitate storage and/or transportation of the dog training device.

Yet another further aspect is a dog training device that may include pedestals that are slidably connected to the cross beams, which may allow the device to be adjusted to the desired width. The pedestals may also be quickly and easily disconnected from the cross beams to facilitate storage and/or transportation of the device.

These and other aspects, features and advantages of the invention will become more fully apparent from the following detailed description of preferred embodiments and appended claims.

BRIEF DESCRIPTION OF THE DRAWINGS

The appended drawings contain figures of preferred embodiments to further clarify the above and other aspects, advantages and features of the invention. It will be appreciated that these drawings depict only preferred embodiments of the invention and are not intended to limit its scope. The invention will be described and explained with additional specificity and detail through the use of the accompanying drawings in which.

DETAILED DESCRIPTION OF PREFERRED EMBODIMENTS

The present invention is generally directed towards an animal training device. For brevity and clarity, the animal training device is discussed in connection with a dog training device. The principles of the present invention, however, are not limited to dog training devices. It will be understood that, in light of the present disclosure, the dog training device disclosed herein can be successfully used in connection with various types of animals and it may be used for different purposes and functions.

Additionally, to assist in the description of the dog training device, words such as top, bottom, front, rear, right and left are used to describe the accompanying figures, which are not necessarily drawn to scale. It will be appreciated, however, that the dog training device can be disposed in a variety of desired positions—including various angles, sideways and even upside down. A detailed description of the dog training device now follows.

Please note that for convenience, some of the components shown in the accompanying figures and discussed in detail below may have the same reference numbers. It will be appreciated, however, that these and other components may have different shapes, sizes, configurations and the like depending, for example, upon the intended use of the dog training device. It will also be appreciated that while the accompanying figures and following detailed description illustrate preferred embodiments of the dog training device, the dog training device may be disposed in other suitable arrangements and may include other parts or components. Further, while the training device is discussed below in connection with dogs, it will be understood that the device could be used in connection with other animals. Additionally, while the animal training device is discussed below in connection with a dog stacking trainer, the device could be used for other appropriate purposes and functions. For example, if could be used to train dogs to do other tasks or stand in other positions. A detailed description of the dog training device now follows.

Figure 1:
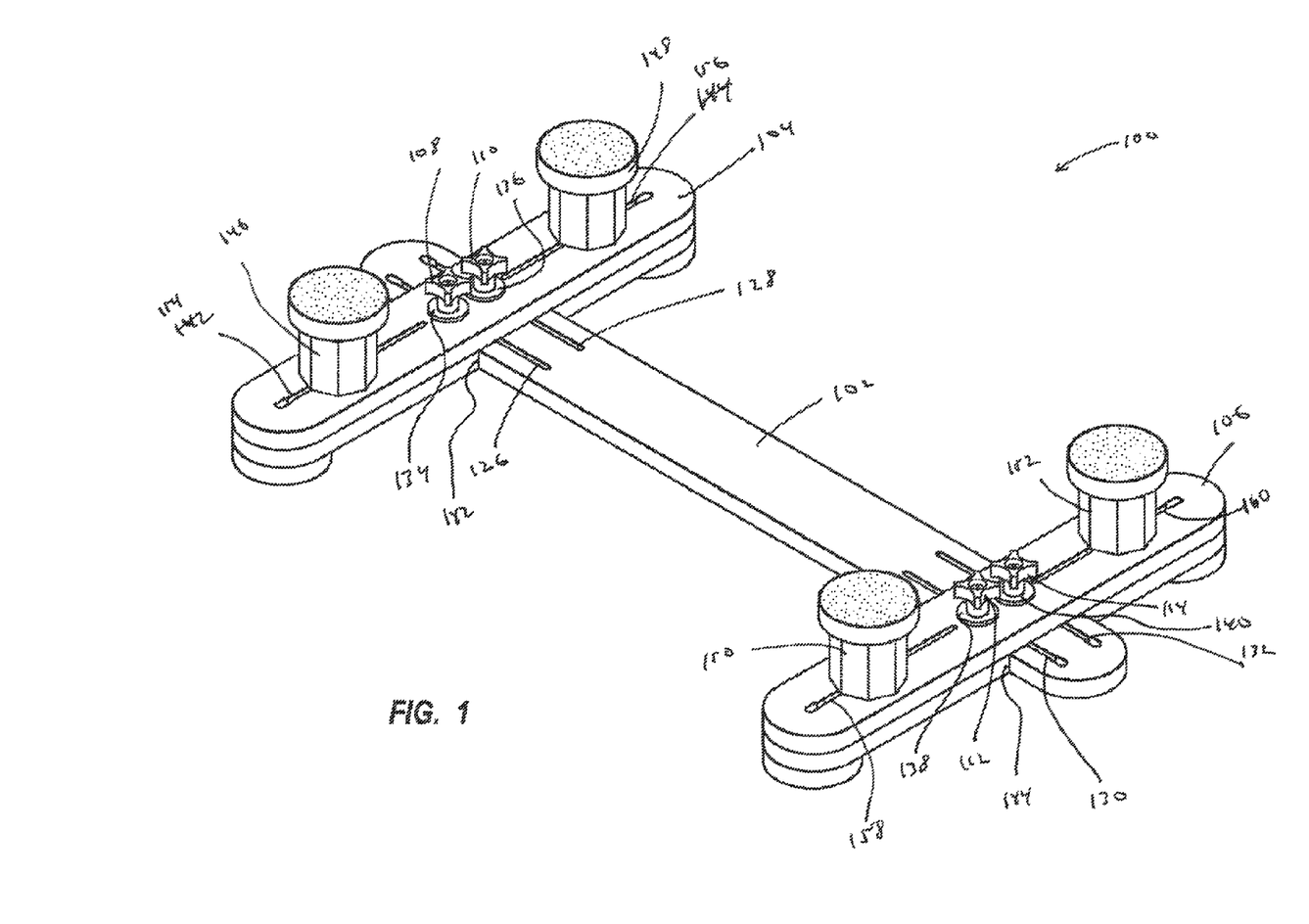
FIG. 1 is a perspective view of an exemplary dog training device.

As seen in FIG. 1, the dog training device 100 may be a dog stacking trainer, which may be used to teach a dog to stand in a desired position. The dog training device 100 may include a base 102 and the base may consist of an elongated member with a generally planar upper surface and a generally planar lower surface. The dog training device 100 may also include cross-beams or cross members 104 and 106, which may be movable relative to the base 102. Desirably, the cross members 104, 106 are coupled to the base 102. For example, the cross members 104, 106 may be slidably coupled to base 102. In particular, the cross members 104, 106 may be connected to the base 102 by fasteners 108, 110, 112, 114.

Figure 6:
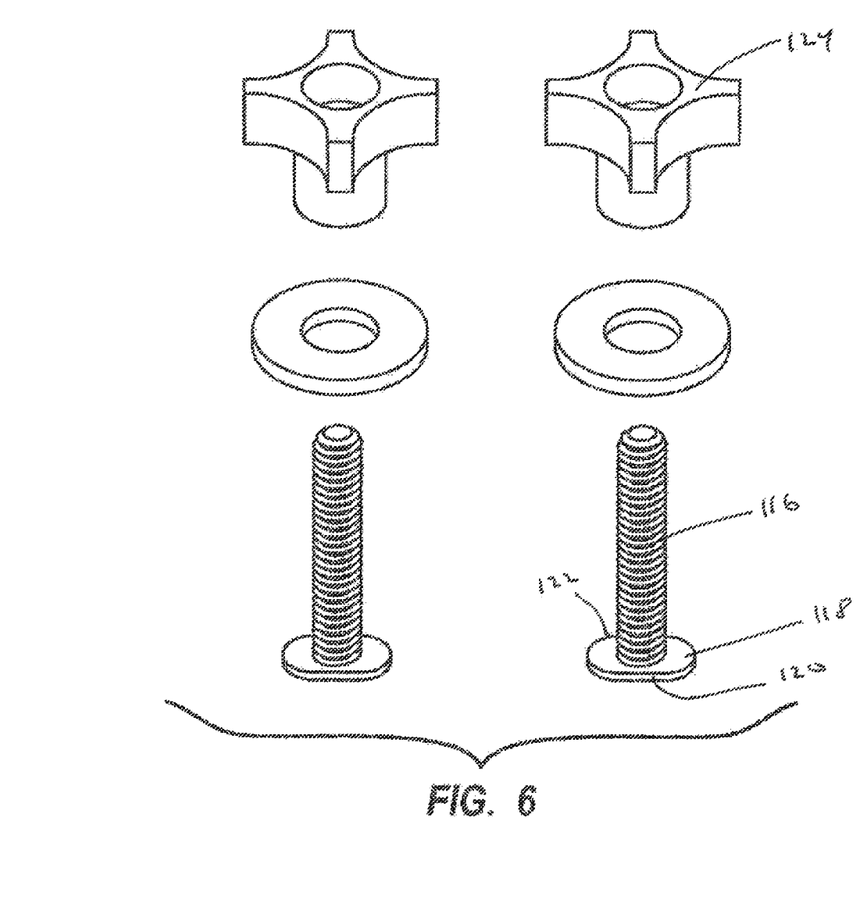
FIG. 6 is an enlarged view of various components that may be used in connection with the dog training device.

As best seen in FIG. 6, an exemplary fastener, which could be one of the fasteners 108, 110, 112, 114, may include a threaded shaft 116 and a head 118. The head 118 preferably has two generally parallel sides 120, 122 that are separated by a generally constant distance. The head 118 may also include rounded ends. Preferably, the length of the head, measured from the rounded ends, is greater than its width, measured between the sides 120, 122. A nut 124, which may be disposed within a knob or handle, is preferably threadably coupled to the shaft 116. As discussed in greater detail below, when the knob 124 is tightened, the fastener may be used to secure the cross member 104, 106 to the base 102. On the other hand, when the knob 124 is loosened, that may allow the cross member 104, 106 to move relative to the base 102 or be disconnected from the base.

The head 118 of the fastener is preferably disposed within a receiving portion in the base 102. In particular, as best seen in FIG. 1, the base 102 may include guides 126, 128, 130, 132 and the heads 118 of the fasteners 108, 110, 112, 114 may be disposed within the guides respectively. The heads 118 of the fasteners 108, 110, 112, 114 are preferably slidably disposed within the guides 126, 128, 130, 132. For example, the guides 126, 128, 130, 132 may have a generally T-shaped configuration with a first portion that receives the heads 118 of the fasteners 108, 110, 112, 114 and an opening or second portion that allows the shafts 116 of the fasteners to extend through. That is, the guides 126, 128, 130, 132 may be sized and configured to allow the shaft 116 of the fasteners 108, 110, 112, 114 to pass through it, but not the head 118 of the fasteners. The first portion of the guides 126, 128, 130, 132 preferably has a width that is slightly larger than the width of the heads 118 of the fasteners 108, 110, 112, 114. This may allow the heads 118 of the fasteners 108, 110, 112, 114 to slide within the guides 126, 128, 130, 132, but the fasteners cannot twist or turn relative to the guides. Advantageously, when the heads 118 of the fasteners 108, 110, 112, 114 are disposed within the guide, the knob 124 can be tightened to secure the cross member 104, 106 in a desired position relative to the base 102 because the heads and shafts do not rotate.

The guides 126, 128, 130, 132 may also include enlarged receiving portions, which may be disposed at or towards the ends of the guides, and the enlarged receiving portions may be sized and configured to allow the heads 118 of the fasteners 108, 110, 112, 114 to be inserted into the guides. In greater detail, the enlarged receiving portions of the guides 126, 128, 130, 132 may have dimensions slightly larger than the head 118 of the fasteners 108, 110, 112, 114 to allow the heads of the fasteners to be easily inserted and/or removed from the guides. When the heads 118 of the fasteners 108, 110, 112, 114 are disposed in the guides 126, 128, 130, 132, the proximity of the sides 120, 122 of the head 118 of the fastener to the inside surfaces of the guides prevents the fasteners from turning or twisting, which allows the knob 124 to be tightened or loosened. This may also allow the fasteners 108, 110, 112, 114 to be quickly and easily connected and disconnected from the guides 126, 128, 130, 132. In addition, this may allow the fasteners 108, 110, 112, 114 to be connected to the guides 126, 128, 130, 132 when the knobs 124 are connected to the fasteners, or when the knobs are disconnected from the fasteners. As shown in the accompanying figures, washers 134, 136, 138, 140 may be disposed between the knobs 124 and the cross members 104, 106, but the washers are not required.

Because the cross members 104, 106 may be slidably coupled to the base 102, the cross members may move relative to the base. This may allow the distance between the cross members 104, 106 to be adjusted, which may allow the dog training device 100 to be used with dogs of different sizes and lengths. When the cross members 104, 106 are in the desired locations, the cross members may be secured in a fixed location by the fasteners 108, 110, 112, 114.

As seen in FIG. 1, the guides 126, 128 may be disposed towards one end of the base 102 and the guides 130, 132 may be disposed towards the other end of the base. The guides 126, 128, 130, 132 are preferably disposed in a generally parallel configuration. In addition, the guides 124, 126, 128, 130 are preferably generally aligned. In particular, the guides 126, 128 are preferably spaced apart by a generally constant distance and are disposed in a generally parallel configuration. Similarly, the guides 130, 132 are preferably spaced apart by a generally constant distance and are disposed in a generally parallel configuration. The guides 126, 130 may also be generally aligned, and the guides 128, 132 may be generally aligned. The pairs of guides 124, 126, 128, 130 may help prevent the cross members 104, 106 from twisting or moving relative to the base 102. It will be understood that the dog training device 100 could have only one guide and the single guide could extend all or at least a portion of the length of the base 102. It will also be understood that the dog training device 100 could include any suitable number of guides and the guides could have other suitable shapes, sizes, configurations and arrangements depending, for example, upon the intended use of the dog training device.

The cross members 104, 106 may also include grooves 142, 144 respectively that are sized and configured to receive at least a portion of the base 102. As shown in the accompanying figures, when the cross members 104, 106 are connected to the base 102, the base is preferably disposed within the grooves 142, 144. Advantageously, the grooves 142, 144 may help maintain the cross members 104, 106 in the desired positions relative to the base 102.

In greater detail, the cross members 104, 106 may be disposed generally perpendicular to the base 102 and the grooves 142, 144 may help position the cross members in the desired positions. For instance, the grooves 142, 144 may be sized and configured to allow a portion of the base 102 to be disposed in the grooves. In addition, the grooves 142, 144 may include sidewalls and the side walls may contact and abut the sidewalls of the base 102 to help position the cross members 104, 106 in the desired positions. The grooves 142, 144 preferably also a height that is generally equal to a height of the base 102 so that a lower surface of the cross members 104, 106 may be generally aligned with a lower surface of the base 102. Advantageously, this may allow the dog training device 100 to be placed on a flat and level surface, such as the floor, ground or table top, and the device may not undesirably move. This may allow the dog training device 100 to remain in a very stable position while a dog is standing on it. It will be appreciated that the dog training device 100 does not require the grooves 142, 144. It will also be appreciated that the base 102 and cross members 104, 106 may be connected in other suitable arrangements and configurations.

The dog training device 100 may also include support or pedestals 146, 148, 150, 152, and these pedestals may be connected to the cross members 104, 106. In particular, one or more of the pedestals 146, 148, 150, 152 may be slidably connected to the cross members 104, 106. For example, the pedestals 146, 148 may be slidably coupled to cross member 104 and the pedestals 150, 152 may be slidably coupled to the cross member 106.

The pedestals 146, 148, 150, 152 may be connected to the cross members 104, 106 by guides 154, 156, 158, 160. Because the pedestals 146, 148 may be slidably coupled to the cross member 104, the distance between the pedestals 146, 148 may be adjusted. Similarly, because the pedestals 150, 152 may be slidably coupled to the cross member 106, the distance between the pedestals 150, 152 may be adjusted. This adjustment of the distances between the pedestals 146, 148, 150, 152 may be used to adjust the dog training device 100 to a desired width. Preferably, the pedestals 146, 148, 150, 152 may be secured in a fixed position for use and readily moveable when it is desired to adjust the positioning of the pedestals. In addition, the pedestals 146, 148, 150, 152 may be readily removable, which may facilitate transportation and/or storage of the dog training device 100.

Figure 2:
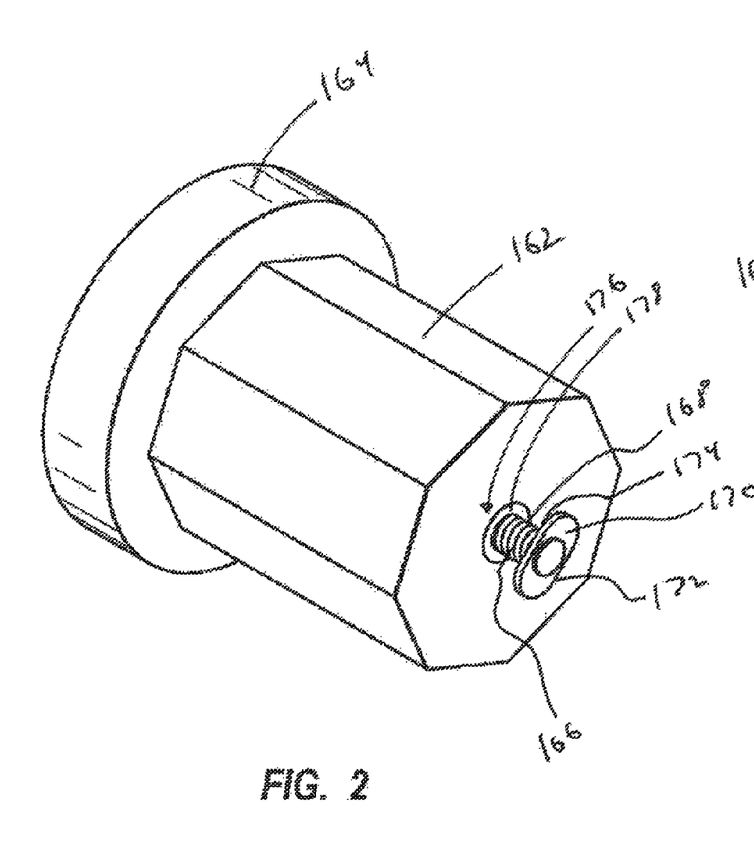
FIG. 2 is an enlarged side perspective view of a portion of the dog training device shown in FIG. 1, illustrating a pedestal.
Figure 3:
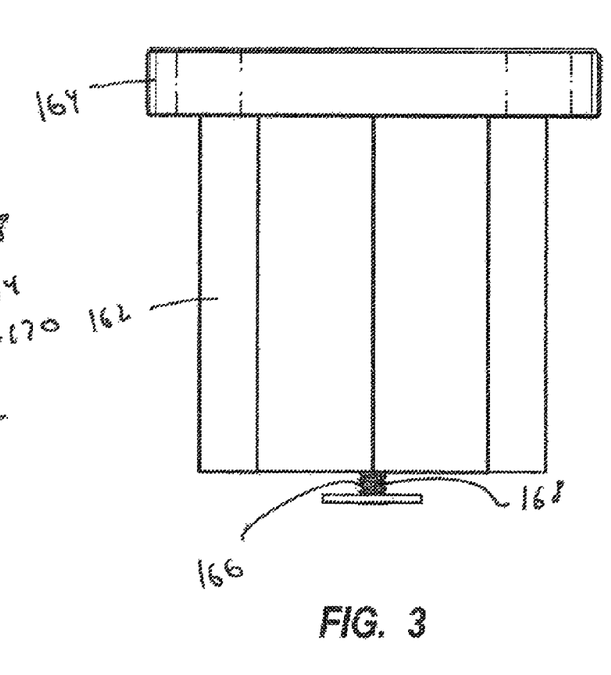
FIG. 3 is a side view of the pedestal shown in FIG. 2.
Figure 4:
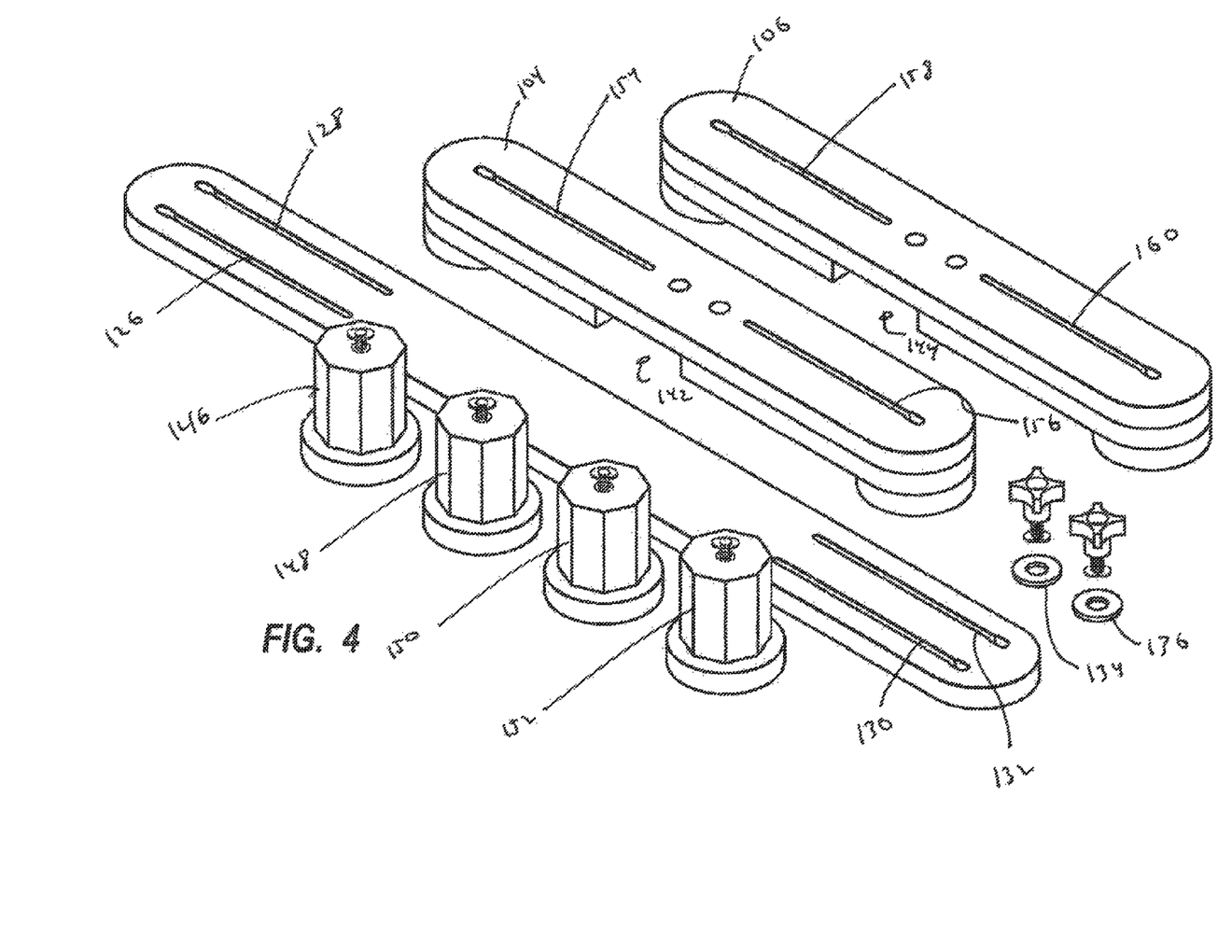
FIG. 4 is another perspective view of the dog training device shown in FIG. 1, illustrating the dog training device in an unassembled configuration.

As best seen in FIG. 2, an exemplary pedestal may include a body 162 with a platform 164 on one end and a guide pin 166 extending from the other end. The platforms 164 may include a textured or non-slip surface and is preferably sized and configured to receive a dog paw. In particular, the platforms 164 of the pedestals 146, 148, 150, 152 may include upper surfaces that are roughened or textured, which may be created by skateboard tape or roughly sanded wood. The roughened or textured surface may help prevent the dog's paws from slipping while standing on the pedestals 146, 148, 150, 152.

In particular, the platform 162 is preferably sized and configured to allow a dog paw to be comfortably placed on the platform, but small enough that the dog cannot move its paw a substantial distance. The guide pin 166 preferably includes a threaded shaft 168 to facilitate attachment of the guide pin to the pedestal and a head 170 with opposing sides 172, 174. The sides 172, 174 of the head 170 are preferably disposed in a generally parallel configuration and spaced by a generally constant distance. The head 170 of the guide pin 166 may also include rounded ends disposed between the sides 172, 174. Preferably, the length of the head 170, measured from the rounded ends, is greater than its width, measured between the sides 172, 174. If desired, the guide pin 166 may have a similar size, shape, configuration and arrangement as the fasteners 108, 110, 112, 114. Advantageously, this may allow the guide pins 166 and fasteners 108, 110, 112, 114 to be interchanged.

If desired, the pedestals 146, 148, 150, 152 may include a receiving portion 176 with a threaded metal insert 178 that is sized and configured to receive the shaft 168 of the guide pin 166. Advantageously, this may allow the guide pin 166 to be threadably coupled to the pedestals 146, 148, 150, 152.

The heads 170 of the guide pins 166 are preferably sized and configured to easily slide within the guides 154, 156, 158, 160 to allow the supports 146, 148, 150, 152 to be disposed in the desired locations along cross members 104, 106. The guide pins 166 are also preferably sized and configured so that when the pedestals 146, 148, 150, 152 are disposed in the desired positions, the pedestals may be can be turned to tighten them against cross-beams 104, 106, which may then secure the pedestals in a fixed position. Advantageously, when the pedestals 146, 148, 150, 152 are disposed in a fixed position, the dog's paws may be placed on stable and secure platforms 164.

Figure 5:
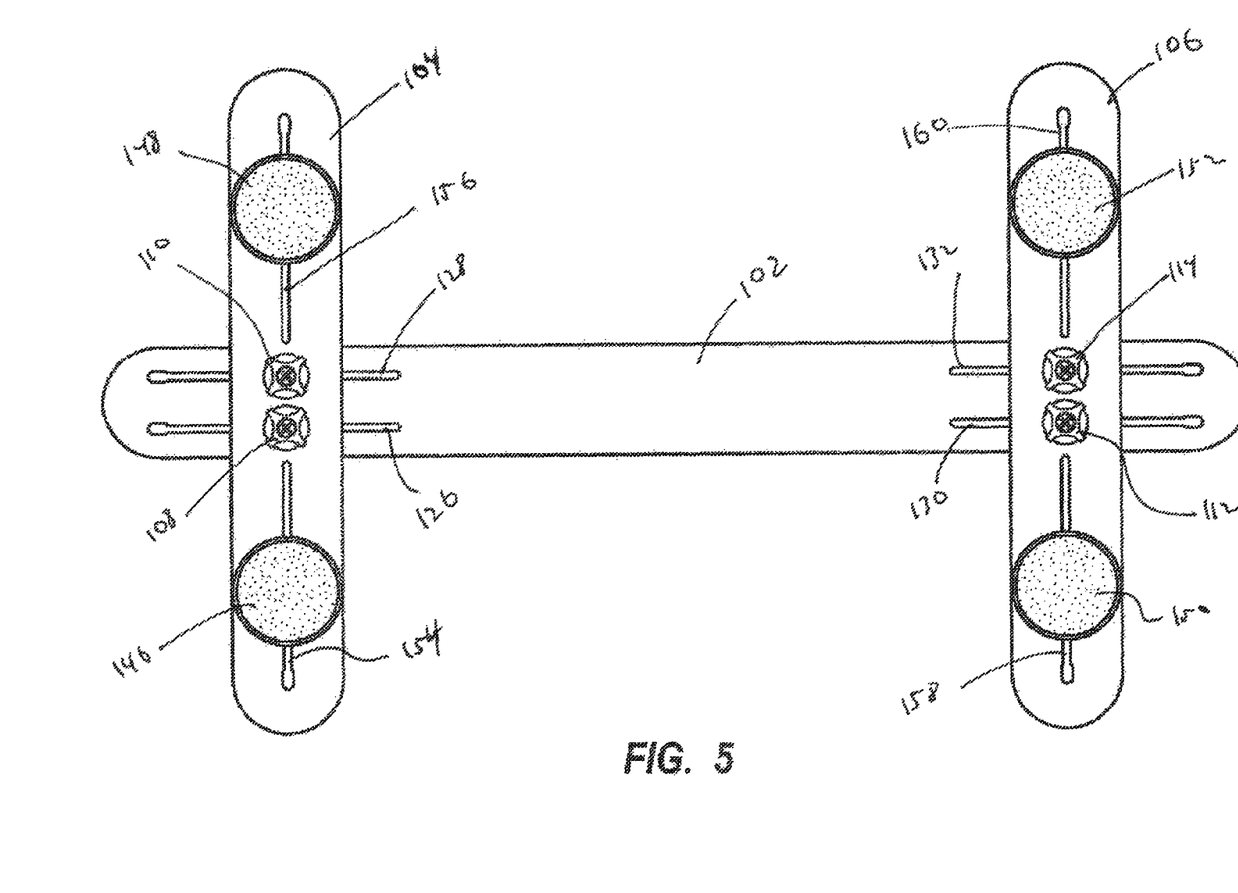
FIG. 5 is still another perspective view of the dog training device shown in FIG. 1, illustrating the dog training device in a partially unassembled configuration.

In greater detail, as best seen in FIGS. 1 and 5, the guides 154, 156 may be disposed in the cross member 104 and the guides 158, 160 may be disposed in the cross member 106. The guides 154, 156 are preferably generally aligned with one guide disposed towards one side of the cross beam 102 and the other guide disposed towards the other side of the cross beam. Similarly, the guides 158, 160 are preferably generally aligned with one guide disposed towards one side of the cross beam 104 and the other guide disposed towards the other side of the cross beam. It will be appreciated that the dog training device 100 may include any suitable number of guides and the guides could have other suitable shapes, sizes, configurations and arrangements depending, for example, upon the intended use of the dog training device.

The guides 154, 156, 158, 160 and the guide pins 166 may have a similar shape, size, configuration and arrangement as the fasteners 108, 110, 112, 144 and the guides 126, 128, 130, 132. For example, the heads 170 of the guide pins 166 may be disposed within the guides 154, 156, 158, 160. The heads 170 of the guide pins 166 are preferably slidably disposed within the guides 154, 156, 158, 160. For example, the guides 154, 156, 158, 160 may have a generally T-shaped configuration with a first portion that receives the heads 170 of the guide pins 166 and an opening or second portion that allows the shafts 168 of the guide pins to extend through. That is, the guides 154, 156, 158, 160 may be sized and configured to allow the shaft 168 of the guide pin 166 to pass through it, but not the head 170 of the guide pin. The first portion of the guides 154, 156, 158, 160 preferably has a width that is slightly larger than the width of the heads 170 of the guide pins 166. This may allow the heads 170 of the guide pins 166 to slide within the guides 154, 156, 158, 160, but the guide pins cannot twist or turn relative to the guides. Advantageously, when the heads 170 of the guide pins 166 are disposed within the guides 154, 156, 158, 160, the pedestals 146, 148, 150, 152 can be tightened to secure the pedestals in a desired position relative to the cross members 104, 106 because the guide pins 166 do not rotate.

The guides 154, 156, 158, 160 may also include enlarged receiving portions, which may be disposed at or towards the ends of the guides, and the enlarged receiving portions may be sized and configured to allow the heads 170 of the guide pins 166 to be inserted into the guides. In greater detail, the enlarged receiving portions of the guides 154, 156, 158, 160 may have dimensions slightly larger than the heads 170 of the guide pins 166 to allow the heads of the guide pins to be easily inserted and/or removed from the guides. When the heads 170 of the guide pins 166 are disposed in the guides 154, 156, 158, 160, the proximity of the sides 172, 174 of the head 170 of the guide pin 166 to the inside surfaces of the guides prevents the guide pins from turning or twisting, which allows the pedestals 146, 148, 150, 152 to be turned so that it is tightened or loosened relative to the cross member. This may also allow the pedestals 146, 148, 150, 152 to be quickly and easily connected and disconnected from the guides 154, 156, 158, 160. In addition, this may allow the pedestals 146, 148, 150, 152 to be connected to the guides 154, 156, 158, 160 when the pedestals are connected to the guide pins 166 or when the pedestals are disconnected from the guide pins.

Because the pedestals 146, 148, 150, 152 may be slidably coupled to the cross members 104, 106, the pedestals may move relative to the cross members. This may allow the distance between the pedestals 146, 148, 150, 152 to be adjusted, which may allow the dog training device 100 to be used with dogs of different sizes. When the pedestals 146, 148, 150, 152 are in the desired locations, the pedestals may be secured in a fixed location by simply turning the pedestals.

The base 102, cross members 104, 106 and pedestals 146, 148, 150, 152 are preferably constructed from wood, but these and other components may be constructed from other suitable materials such as metal, plastic, and the like. In addition, the guides 126, 128, 130, 132 in the base 102 and the guides 154, 156, 158, 160 in the cross members 104, 106 may be formed by milling or cutting, but the guides could be formed by any suitable methods or processes.

In order to assemble the dog training device 100, the base 102 may be placed on a support surface with the guides 126, 128, 130, 132 in an exposed position. The cross member 104 may be connected to the guides 126, 128 by the fasteners 108, 110 and the cross member 106 may be connected to the guides 130, 132 by the fasteners 112, 114. In particular, the heads 118 of the fasteners 108, 110, 112, 114 may be disposed in the respective guides 126, 128, 130, 132 and the knobs 124 may be tightened when the cross members 104, 106 are in the desired positions. The guide pins 166 may be connected to the pedestals 146, 148, 150, 152 and the heads of the guide pins may be disposed in the guides 154, 156, 158, 160 respectively. When the pedestals 146, 148, 150, 152 are in the desired positions, the pedestals may be rotated to secure them in a fixed position. A similar process may be used to disassemble the dog training device 100.

Advantageously, the dog training device 100 may be assembled and/or disassembled in any suitable order or sequence, which may facilitate use of the device. In addition, the various components of the dog training device 100 may be interchangeable. For example, the cross members 104, 106; the fasteners 108, 110, 112, 114; the pedestals 146, 148, 150, 152; and the guide pins 166 may be interchangeable. This may facilitate manufacturing, use and repair of the dog training device.

Although this invention has been described in terms of certain preferred embodiments, other embodiments apparent to those of ordinary skill in the art are also within the scope of this invention. Accordingly, the scope of the invention is intended to be defined only by the claims which follow.

What is claimed is:

1. A dog stacking trainer to facilitate teaching a dog to stand in a particular way, the dog stacking trainer comprising:
    a base;
    a first elongated slot disposed proximate a first end of the base;
    a first cross member including a receiving portion that receives a portion of the base;
    a first connector connecting the first cross member to the base, a portion of the first connector being disposed in the first elongated slot to allow the first cross member to be positioned in multiple locations relative to the base;
    a first dog paw support pedestal adjustably connected to the first cross member, the first dog paw support pedestal including a base and a platform with a generally planar upper surface, the platform being disposed above the first cross member and being sized slightly larger than a dog paw;
a second dog paw support pedestal adjustably connected to the first cross member, the second dog paw support pedestal including a base and a platform with a generally planar upper surface, the platform being disposed above the first cross member and being sized slightly larger than a dog paw;
a second elongated slot disposed proximate a second end of the base;
a second cross member including a receiving portion that receives a portion of the base;
a second connector connecting the second cross member to the base, a portion of the second connector being disposed in the second elongated slot to allow the second cross member to be positioned in multiple locations relative to the base;
a third dog paw support pedestal adjustably connected to the second cross member, the third dog paw support pedestal including a base and a platform with a generally planar upper surface, the platform being disposed above the second cross member and being sized slightly larger than a dog paw;
a fourth dog paw support pedestal adjustably connected to the second cross member, the fourth dog paw support pedestal including a base and a platform with a generally planar upper surface, the platform being disposed above the second cross member and being sized slightly larger than a dog paw;
wherein the first cross member, the second cross member, the first dog paw support pedestal, the second dog paw support pedestal, the third dog paw support pedestal and the fourth dog paw support pedestal are adjustable to teach a dog to stand in a particular way.

2. The dog stacking trainer as in claim 1, wherein the first cross member includes a first elongated slot and the first dog paw support pedestal is adjustably connected to the first cross member by a fastener that is at least partially inserted into the first elongated slot;
wherein the first cross member includes a second elongated slot and the second dog paw support pedestal is adjustably connected to the first cross member by a fastener that is at least partially inserted into the second elongated slot;
wherein the second cross member includes a third elongated slot and the third dog paw support pedestal is adjustably connected to the second cross member by a fastener that is at least partially inserted into the third elongated slot; and
wherein the second cross member includes a fourth elongated slot and the fourth dog paw support pedestal is adjustably connected to the second cross member by a fastener that is at least partially inserted into the fourth elongated slot.

3. The dog stacking trainer as in claim 1, wherein the first dog paw support pedestal is adjustably connected to the first cross member by a fastener, the fastener including a head with two generally parallel opposing sides, the head of the fastener being disposed in an enlarged receiving portion and a body of the fastener disposed in an elongated slot formed in the first cross member.

4. The dog stacking trainer as in claim 1, wherein the first connector connecting the first cross member to the base includes a head with two generally parallel opposing sides, the head of the fastener being disposed in an enlarged receiving portion and a body of the fastener being disposed in the first elongated slot, the first cross member being movable along a length of the base.

5. The dog stacking trainer as in claim 1, wherein the first cross member and the second cross member are movable along a length of the base so that the first and second cross members may be moved towards each other or away from each other to help position the first, second, third and fourth dog paw support pedestals in a desired location.

6. The dog stacking trainer as in claim 1, further comprising:
a first elongated slot formed in the first cross member and a first fastener disposed in the first slot, the first fastener connecting the first dog paw support pedestal to the first cross member, the first dog paw support pedestal being movable towards and away from the base;
a second elongated slot formed in the first cross member and a second fastener disposed in the second slot, the second fastener connecting the second dog paw support pedestal to the first cross member, the second dog paw support pedestal being movable towards and away from the base;
a third elongated slot formed in the second cross member and a third fastener disposed in the third slot, the third fastener connecting the third dog paw support pedestal to the second cross member, the third dog paw support pedestal being movable towards and away from the base; and
a fourth elongated slot formed in the second cross member and a fourth fastener disposed in the fourth slot, the fourth fastener connecting the fourth dog paw support pedestal to the second cross member, the fourth dog paw support pedestal being movable towards and away from the base.

7. The dog stacking trainer as in claim 1, wherein the first cross member includes a first guide;
wherein the first pedestal includes a guide pin with a head having two generally parallel opposing sides, the head of the guide pin being disposed in the first guide in the first cross member;
wherein the first cross member includes a second guide; and
wherein the second pedestal includes a guide pin with a head having two generally parallel opposing sides, the head of the guide pin being disposed in the second guide in the first cross member.

8. The dog stacking trainer as in claim 1, wherein each of the dog paw support pedestals can be moved between a first position in which the dog paw support pedestals are disposed in a fixed position and a second position in which the dog paw support pedestals are slidably connected to a cross member.

9. The dog stacking trainer as in claim 1, wherein the first cross member is slidably connected to the base;
wherein the second cross member is slidably connected to the base;
wherein the first dog paw support pedestal is slidably connected to the first cross member;
wherein the second dog paw support pedestal is slidably connected to the first cross member;
wherein the third dog paw support pedestal is slidably connected to the second cross member; and
wherein the fourth dog paw support pedestal is slidably connected to the second cross member.

10. The dog stacking trainer as in claim 1, wherein the cross member are movable longitudinally relative to the base and the dog paw support pedestals move laterally relative to the base.

11. An animal training device that is sized and configured to training animals to stand in a particular way, the animal training device comprising:
- a base including a first slot that is disposed proximate a first end of the base and a second slot that is disposed proximate a second end of the base;
- a first cross member comprising:
  - a central receiving portion that receives a portion of the base;
  - a first slot disposed between an end of the first cross member and the central receiving portion; and
  - a second slot disposed between an opposing end of the first cross member and the central receiving portion;
- a first connector disposed within the first slot in the base and connecting the first cross member to the base;
- a first animal foot support pedestal comprising:
  - a body;
  - a fastener connected to the body and disposed within the first slot in the first cross member to allow the first animal foot support platform to move relative to the base; and
  - a platform connected to the body and disposed above the first cross member, the platform including a generally planar upper surface that is slightly larger than an animal foot; and
- a second animal foot support pedestal comprising:
  - a body;
  - a fastener connected to the body and disposed within the second slot in the first cross member to allow the second animal foot support platform to move relative to the base; and
  - a platform connected to the body and disposed above the first cross member, the platform including a generally planar upper surface that is slightly larger than an animal foot;
- wherein the first cross member, the first animal foot support pedestal and the second animal foot support pedestal are movable relative to the base so that the animal foot support pedestals may be positioned to train the animal to stand in a particular position.

12. The animal training device as in claim 11, further comprising:
- a second cross member comprising:
  - a central receiving portion that receives a portion of the base;
  - a third slot disposed between an end of the second cross member and the central receiving portion; and
  - a fourth slot disposed between an opposing end of the second cross member and the central receiving portion;
- a second connector disposed within the second slot in the base and connecting the second cross member to the base;
- a third animal foot support pedestal comprising:
  - a body;
  - a fastener connected to the body and disposed within the third slot in the second cross member to allow the third animal foot support platform to move relative to the base; and
  - a platform connected to the body and disposed above the second cross member, the platform including a generally planar upper surface that is slightly larger than an animal foot; and
- a fourth animal foot support pedestal comprising:
  - a body;
  - a fastener connected to the body and disposed within the fourth slot in the second cross member to allow the fourth animal foot support platform to move relative to the base; and
  - a platform connected to the body and disposed above the second cross member, the platform including a generally planar upper surface that is slightly larger than an animal foot;
- wherein the second cross member, the third animal foot support pedestal and the fourth animal foot support pedestal are movable relative to the base so that the animal foot support pedestals may be positioned to train the animal to stand in a particular position.

13. The animal training device as in claim 12, wherein the cross members are movable longitudinally relative to a length of the base and the animal support pedestals are movable laterally relative to the length of the base.

14. The animal training device as in claim 12, wherein the first slot and the second slot in the first cross member are generally aligned along a first axis;
- wherein the third slot and the fourth slot in the second cross member are generally aligned along a second axis;
- wherein the first axis is disposed generally parallel to the second axis.

15. The animal training device as in claim 12, wherein the cross members and the animal foot support pedestals are independently adjustable so that a variety of animals of different sizes can use the animal training device.

16. The animal training device as in claim 11, wherein the first slot disposed proximate the first end of the base and the second slot disposed proximate the second end of the base are generally aligned along an axis.

17. The animal training device as in claim 11, wherein the animal to be used in connection with the animal training device is a dog;
- wherein the animal foot support pedestals are sized slightly larger than a paw of the dog; and
- wherein animal foot support pedestals are positioned to train a dog to stand in a desired position.

18. The animal training device as in claim 17, wherein the platform of the animal foot support pedestals includes a textured upper surface to facilitate a dog standing on the animal foot support pedestals.

19. The animal training device as in claim 11, wherein the animal foot support pedestals can be moved between a first position in which the pedestals are disposed in a fixed position and a second position in which the pedestals are freely movable relative to the cross members.

20. The animal training device as in claim 11, further comprising a third slot disposed proximate the first end of the base, the first slot and the third slot being disposed in a generally parallel configuration and spaced apart by a generally constant distance; and
- further comprising fourth slot disposed proximate the second end of the base, the second slot and the fourth slot being disposed in a generally parallel configuration and spaced apart by a generally constant distance;
- wherein the first and second slots are generally aligned along a first axis; and
- wherein the third and fourth slots are generally aligned along a second axis.

* * * * *